United States Patent Office

3,632,765
Patented Jan. 4, 1972

---

3,632,765
TREATMENT OF SHOCK
Spencer M. Fossel, Bernardsville, N.J., assignor to Unimed, Inc., Morristown, N.J.
No Drawing. Filed July 18, 1969, Ser. No. 843,194
Int. Cl. A61k 27/00
U.S. Cl. 424—263       7 Claims

---

ABSTRACT OF THE DISCLOSURE

The treatment of shock (hemorrhagic shock, endotoxin shock, cardiogenic shock, surgical shock or toxic shock) by administering to a patient after the onset of the symptoms of such shock and prior to the shock becoming irreversible of an effective amount of beta-(2-pyridyl-lower alkyl)-amine or beta-(4-pyridyl-lower alkyl)-amine.

---

BACKGROUND OF THE INVENTION

Shock is a broad term used, inter alia, to describe a sudden physical or mental disturbance or a state of profound mental and physical depression or abnormally palpable impact or a condition of acute peripheral circulatory failure, etc. There are many different types of shock including anaphylactic shock, cardiogenic shock, insulin shock, etc.

The type of shock to which this invention relates is generally marked by a failure of the circulatory system to maintain an effective relationship between cardiac action, blood volume and vascular tone, and it includes decreased venous return to the heart which may be due not to the inability of the heart muscle to pump blood, but rather because the ventricles do not receive the blood to pump. The specific types of shock which are marked by these conditions are hemorrhagic shock, endotoxin shock, cardiogenic shock, surgical shock and toxic shock. Thus, for facility of discussion herein, the term "shock" as used throughout the specification and claims of this case will refer to such hemorrhagic shock, endotoxin shock, cardiogenic shock, surgical shock or toxic shock which is marked by a failure of the circulatory system to maintain an effective relationship between cardiac action, blood volume and vascular tone and which includes decreased venous return to the heart due, possibly, to insufficient blood volume rather than inability of the heart muscle to pump blood.

This definition will apply throughout the specification and claims hereof, unless specifically indicated to the contrary.

There is no single treatment for shock as defined herein, however, general medical management of such shock includes various approaches some of which are taken singly and some of which are taken in combination.

The present invention is not provided as a cure-all for shock, and neither is it provided as the treatment of choice at all times for shock. Rather, the present invention provides an addition to the physician's armamentarium in the treatment of shock.

SUMMARY OF THE INVENTION

Generally speaking, in accordance with the present invention, upon the onset of symptoms of shock as defined herein, the subject suffering from the same, animal or human, is administered a shock treatment effective amount of at least one member selected from the group consisting of beta-(2-pyridyl-lower alkyl)-amines, beta-(4-pyridyl-lower alkyl)-amines and non-toxic acid addition salts thereof.

It is accordingly a primary object of the present invention to provide a method to be used in the treatment of shock according to which method the subject exhibiting symptoms of shock, and prior to the shock becoming irreversible, is administered a beta-(2- or 4-pyridyl-lower alkyl)-amine or acid addition salt thereof.

It is another object of the present invention to provide a method of treatment of shock which can be used alone or in combination with other methods of treating shock to improve the condition of the subject under shock.

Other objects and advantages of the present invention will be apparent from a further reading of the specification and of the appended claims.

The beta-(2- or 4 - pyridyl-lower alkyl)-amines are of the following general formula:

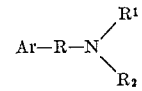

wherein Ar is the pyridyl group attached to the radical R by its 2 or 4 carbon atom, wherein R is a lower alkyl of up to 5 carbon atoms, and wherein $R_1$ and $R_2$ may be hydrogen or lower alkyl. The most preferred alkyl groups are methyl, ethyl and propyl. Among the most preferred compounds are beta-(2-pyridyl)-ethyl methyl amine, beta-(4-pyridyl)-ethyl methyl amine, 1-(2-pyridyl)-2-methyl amino propane, and the like. The non-toxic acid addition salts include the hydrochloride, the tartrate, the fumarate, the gluconate, the sulfate, etc.

The beta-(2- or 4-pyridyl alkyl)-amines may be administered orally or parenterally in the treatment of the shock. While very small amounts thereof can be used in some cases, it is important to note that large doses of these substances can be well tolerated by animals and humans, and the substances can be administered in large amounts in the treatment of severe cases of shock. It is possible to administer small doses continuously, e.g. by intravenous infusion, so that after a time the total dosage is quite high, or it is also possible to administer massive doses at one time. The actual amount administered and the manner of administration will depend upon each particular case.

Thus, unit dosages may be as low as 4–8 mg. three times a day or may be as high as 200 mg. in a unit dosage given once or even three or four times a day. An indication as to the amount of the beta-(2- or 4-pyridyl alkyl)-amine which may be administered is given in the test which will be described below, in which dogs were intravenously infused at a rate of 0.1 mg./kg./min. for a period of four hours, which is equivalent to 24 mg. per kg. of body weight. As indicated previously, the administration, which is commenced upon the onset of the symptoms of shock, and prior to the shock becoming irreversible, may be oral or by injection. Generally, in cases of severe shock, the administration is by injection.

The treatment of the shock in accordance with the present invention utilizing the beta-(2- or 4-pyridyl alkyl)-amines may be the sole treatment, though it is generally used in combination with other treatments for shock, for example in addition to adrenalin to try to overcome hemorrhagic shock. Other treatments of shock which may be used in combination (simultaneously or successively with the treatment of the present invention) include the use of a single massive intravenous injection of steroid as proposed by Dr. Lillehei and Dr. Dietzman of the University of Minnesota. Other treatments include the use of oxygen, the use of blood, plasma or electrolyte solutions, the use of pressor drugs such as norepinephrine, the use of isoproterenol, the use of antibiotics where septicemia is suspected, and the like treatments, all of which are well known to medical profession.

DESCRIPTION OF PREFERRED EMBODIMENTS

The following examples are given to further illustrate the present invention. The scope of the invention is not, however, meant to be limited to the specific details of the examples.

EXAMPLE 1

This example describes an evaluation of the use of beta-(2-pyridyl)-ethyl methyl amine hydrochloride (hereinafter referred to as "betahistine hydrochloride") in the treatment of endotoxin shock.

The following experimental procedure was utilized:

(1) E. coli endotoxin (6 mg./kg.) was administered to 12 unanesthetized mongrel dogs.

(2) Six dogs were infused intravenously with betahistine hydrochloride at the rate of 0.1 mg./kg./min. Infusions began at 2 hours after the administration of the endotoxin, and continued for a period of 4 hours.

(3) The remaining 6 animals served as controls.

The arterial pressure and cardiac rate of all dogs (controls and those treated with betahistine hydrochloride) were measured against time. A comparison between the groups indicates that the betahistine hydrochloride evoked a slight, but insignificant, hypotensive effect. No effect on the cardiac rate was discernible.

The following table compares the effect of the betahistine on survival after the administration of the endotoxin with the control group.

EFFECT OF BETAHISTINE HYDROCHLORIDE [a] ON SURVIVAL AFTER ENDOTOXIN [b] ADMINISTRATION IN UNANESTHETIZED DOGS

| Group | No. of dogs | No. of survivors | Percent survival | Survival time of non-survivors (hrs.) | Mean survival time±S.D. (hrs.) |
| --- | --- | --- | --- | --- | --- |
| Control | 6 | 1 | 17 | 3.3<br>3.4<br>4.1<br>6.6<br>2.0 | 3.9±1.5 |
| Betahistine hydrochloride | 6 | 4 | 67 | 4.3<br>16.0 | 10.2±5.9 |

[a] Betahistine hydrochloride infused I.V. (0.1 mg./kg./min.) from 120 to 360 minutes after endotoxin administration.
[b] E. coli endotoxin, 6 mg./kg. I.V.
[c] Survived 48 hours or more.

A comparison between the groups shows that both survival time (hours) and survival rate (percent survivors in group) were significantly greater in the betahistine hydrochloride-treated group of dogs.

Substantially equivalent results are obtained by substituting 1-(2-pyridyl)-2-ethyl methyl amine hydrochloride or 1-(2-pyridyl)-2-methyl amino propane hydrochloride for the beta-(2-pyridyl)-ethyl methyl amine hydrochloride.

The above is a standard test to determine efficacy in connection with treatment of endotoxin shock.

EXAMPLE 2

Betahistine hydrochloride is evaluated in the treatment of hemorrhagic shock in a manner similar to the above described evaluation in connection with endotoxin shock. A series of dogs are caused to go into hemorrhagic shock by bleeding of the dogs. Three hours after the onset of the shock blood replacement is commenced on all dogs. In a group of control dogs only blood replacement is carried out. In the treatment group of dogs (the same number) blood replacement is accompanied by introvenous infusion of physiological solution of betahistine hydrochloride.

A comparison between the groups shows that both survival time (hours) and survival rate (percent survivors in group) were significantly greater in the group of dogs treated with the betahistine hydrochloride.

While the invention has been illustrated in particular with respect to treatment of shock in certain manners, it is to be understood that variations of the invention can be made without departing from the spirit or scope of the invention.

What is claimed is:

1. Method of treating shock marked by a failure of the circulatory system to maintain an effective relationship between cardiac action, blood volume, and vascular tone, which comprises administering to a subject suffering from such circulatory system failure shock after the onset of the symptoms of said shock and prior to the shock becoming irreversible of a shock treatment effective amount of at least one member selected from the group consisting of beta-(2-pyridyl-lower alkyl)-amine, beta (4-pyridyl-lower alkyl)-amine and non-toxic acid addition salts thereof.

2. Method according to claim 1 wherein the mode of administration is by injection.

3. Method according to claim 1 wherein the subject is suffering from hemorrhagic shock.

4. Method according to claim 1 wherein the subject is suffering from endotoxin shock.

5. Method according to claim 1 wherein the mode of administration is by continuous infusion.

6. Method according to claim 1 wherein the subject is suffering from hemorrhagic shock and said member is infused while the subject is being given a blood transfusion.

7. Method according to claim 1 wherein said member is beta-(2-pyridyl)-ethyl methyl amine.

References Cited

FOREIGN PATENTS 1,103,135    2/1968    Great Britain.
6,612,711    3/1967    Netherlands.

RICHARD L. HUFF, Primary Examiner